United States Patent [19]

Weiler

[11] Patent Number: 4,685,686
[45] Date of Patent: Aug. 11, 1987

[54] SEALING CAP FOR A BOLT GUIDE OF A SPOT-TYPE DISC BRAKE

[75] Inventor: Rolf Weiler, Frankfurt/Main-Sindlingen, Fed. Rep. of Germany

[73] Assignee: Alfred Teves GmbH, Frankfurt am Main, Fed. Rep. of Germany

[21] Appl. No.: 736,427

[22] Filed: May 20, 1985

[30] Foreign Application Priority Data

May 19, 1984 [DE] Fed. Rep. of Germany ....... 3418806

[51] Int. Cl.$^4$ ............................ F16J 3/04; F16J 15/52
[52] U.S. Cl. ............................... 277/212 FB; 74/18.1; 403/50
[58] Field of Search ............... 277/212 R, 212 FB; 74/18, 18.1, 18.2; 403/50, 51

[56] References Cited

U.S. PATENT DOCUMENTS

| | | | |
|---|---|---|---|
| 3,381,987 | 5/1968 | Husen | 277/212 FB |
| 3,403,932 | 10/1968 | Kutcher | 277/212 FB |
| 4,154,546 | 5/1979 | Merrick et al. | 277/212 FB |
| 4,199,159 | 4/1980 | Evans | 277/212 FB |
| 4,276,759 | 7/1981 | Faulbecker | 277/212 FB |
| 4,325,587 | 4/1982 | Seigert | 277/212 FB |
| 4,527,803 | 7/1985 | Rose | 277/212 FB |
| 4,530,506 | 7/1985 | Weiler et al. | 277/212 FB |

Primary Examiner—Robert S. Ward
Attorney, Agent, or Firm—James B. Raden; William J. Michals

[57] ABSTRACT

A sealing cap for cylindrical parts such as a bolt guide of a spot-type disc brake, comprises an elastic pleated bellows (15), one end portion of which is fastened to the periphery of a first cylindrical part, while the other end portion thereof is secured to the periphery of a second cylindrical part. A rigid reinforcing and retaining member (16, 17) is provided on at least one of said end portions (13, 14), with each reinforcing and retaining member being arranged with at least part of its radial extension on the same radius. To create a sealing cap which affords ease of manufacture and assembly, at least one of the reinforcing and retaining members (16, 14, 58) is provided of substantially U-shaped configuration when viewed in axial cross-section, thus forming first and second wall portions (26, 27; 47, 67; 59) as well as a base portion interconnecting said wall portions. The wall portions embracing the end portion (14; 38) of the sealing cap (12; 36) in a bracket-like manner, and at least one of the wall portions (26; 47; 59) is arranged in an annular groove (26; 53) in the corresponding cylindrical part.

13 Claims, 5 Drawing Figures

SEALING CAP FOR A BOLT GUIDE OF A SPOT-TYPE DISC BRAKE

BACKGROUND OF THE INVENTION

This invention relates to a sealing cap for cylindrical parts and more particularly, for a bolt guide of a spot-type disc brake. The invention comprises an elastic (pleated) bellows one end portion of which is adapted to be secured at the periphery of a first cylindrical part and the other end portion of which is adapted to be secured at the periphery of a second cylindrical part. A rigid reinforcing and retaining member is provided on at least one of the end portions, with each reinforcing and retaining member being arranged on the same radius with at least part of its radial extension.

Such sealing caps are described in German patent application No. P 33 26 482.1 wherein the reinforcing and retaining members are of L-shaped configuration in axial cross-section and are connected to the elastic bellows by vulcanization. As a result, the manufacturing process is relatively complicated and costly.

It is, therefore, an object of the present invention to improve a sealing cap of the type described so as to render it simpler and less expensive to manufacture.

SUMMARY OF THE INVENTION

This object is achieved according to the present invention wherein at least one of the reinforcing and retaining members is of substantially U-shaped configuration in axial longitudinal cross-section, thus forming a front wall portion, a rear wall portion and a base portion interconnecting these wall portions which embrace the end portion of the elastic bellows in a bracket-like manner. This provides a sealing cap for cylindrical parts such as a bolt guide of a spot-type disc brake, which affords simple and inexpensive manufacture. In addition, the reinforcing and retaining member in accordance with the present invention readily accommodates pre-assembly.

In one embodiment one of the wall portions is suitably arranged in an annular groove provided in the corresponding cylindrical part. In this arrangement, a boundary wall of the annular groove advantageously is in sealing abutment on the end portion of the elastic bellows. Because of the boundary wall, a sealing edge is provided which affords good seal-tightness in this area while reliably preventing the end portion of the elastic bellows from slipping out of the reinforcing and retaining member.

In another embodiment of the present invention, this possibility of slipping out is further prevented in that the respective end portion of the elastic bellows forms an enlarged foot, when viewed in longitudinal cross-section. Expediently, this enlarged foot includes conical wall surfaces so that the wall portions of the correspondingly adapted reinforcing and retaining member are bent towards one another at their ends and firmly embrace the enlarged foot of the elastic bellows.

Another embodiment of the present invention provides that the wall portion arranged in the annular groove is shorter in a radial direction than the wall portion arranged outside of the annular groove. This keeps the groove's width and the arrangement's diameter small in this area. In an improvement of this design, an end portion of the elastic pleated bellows includes an axially extending shoulder which is at least partially arranged in the annular groove. This allows the groove wall to extend beyond the shoulder, thus accomplishing a better sealing and retaining effect. The wall portion arranged outside of the groove suitable extends transversely to the base portion and is inclined towards the other wall portion, thus improving the retaining effect of the reinforcing and retaining member still further.

Another advantageous arrangement of the reinforcing and retaining member is represented by the base portion of the reinforcing and retaining member being seated on an axially extending cylindrical extension of the corresponding cylindrical part.

To obtain improvement of the rubber seat of the foot-shaped end portion of the elastic bellows, the radially outer boundary wall of the annular groove may be provided with a chamfer on which the foot-like enlarged end portion of the bellows takes support.

In order to compensate tolerances, another embodiment provides radial projections on the base portion of the reinforcing and retaining member. In this respect, a fitting aid can be provided if the radial projections extend over only part of the length of the base portion, so that the front part, when viewed in the assembling direction, is free from such projections.

An assembling device for the inventive U-shaped sealing caps provides a mounting tool with a stepped cylindrical mandrel, with a front annular retaining portion on which the reinforcing and retaining member can be arranged, with an annular groove at the step-like transition from the annular retaining portion to a portion of larger diameter, in which a wall portion of the reinforcing and retaining member can be placed, and with an insertion chamfer provided at the front end of the retaining portion. Expediently, there is provided another insertion chamfer at the transition from the annular groove to the portion of enlarged diameter. This assembling device enables mounting of the sealing caps in a very simple way by moving an end portion of the elastic bellows by way of the insertion chamfer, the front wall portion of the reinforcing and retaining member and the second insertion chamfer into the inside of the reinforcing and retaining member.

BRIEF DESCRIPTION OF THE DRAWING

The present invention will be described in more detail hereinbelow by way of embodiments illustrated in the accompanying drawing wherein.

DETAILED DESCRIPTION

Figure 1:
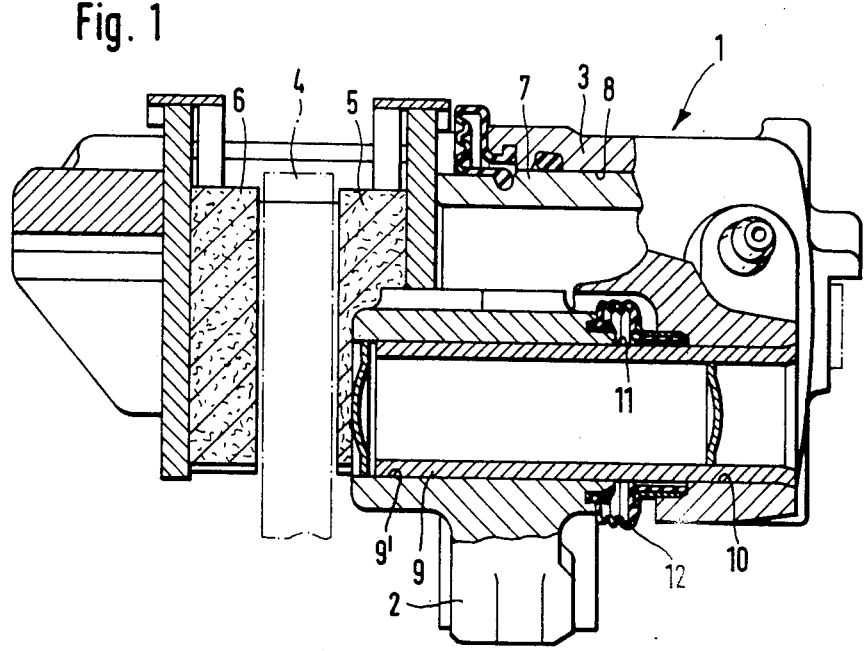
FIG. 1 is a longitudinal section through a spot-type disc brake using the inventive sealing cap.

As illustrated in FIG. 1, the spot-type disc brake 1 is substantially composed of a brake support member 2 that is rigidly coupled to the vehicle, for instance to a (not shown) steering knuckle, of a caliper 3 axially slidable on the brake support member 2 and fist-like straddling the brake disc 4 drawn in dotted lines, of two brake pads 5, 6 and a brake piston 7 which is axially slidably guided in a cylinder bore 8 of the caliper 3. The actuation of the brake is effected by a hydraulic pressure developing in the cylinder bore 8, the said pressure acting upon the brake piston 7 and moving said, and thus the assigned brake pad 5, against the brake disc 4. As a reaction, there is movement of the caliper 3 in opposite direction, thus causing likewise the brake pad 6 arranged on the opposite side to move against the brake disc 4.

Figure 2:
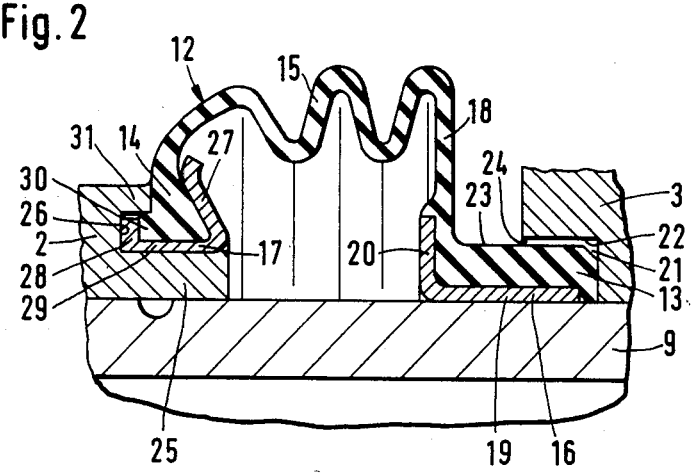
FIG. 2 is an enlarged partial longitudinal cross-section through the bolt guide of the spot-type disc brake according to FIG. 1 including the sealing cap.

For the purpose of axially slidably coupling the caliper 3 with the brake support member 2, a carrier bolt 9 of hollow design is axially movably placed in a bore 9′ of the brake support member 2, the other end of said bolt being seated immovably in a bore 10 of the caliper 3. The free surface of the carrier bolt 9 thus forms a guide surface 11. To protect this guide surface 11 against contamination and damages, the space between the oppositely disposed ends of the brake support member 2, on the one hand, and the caliper 3, on the other hand, is enclosed by a sealing cap 12. This sealing cap is provided with a pleated bellows to attain the required freedom of motion. The end parts of the brake support member 2, of the caliper 3 as well as the carrier bolt 9 are shown in FIG. 2 in a partial longitudinal cross-section on an enlarged scale. As is apparent from FIG. 2, the sealing cap comprises two end portions 13, 14 which are interconnected by a pleated bellows 15. Both end portions 13, 14 are furnished with reinforcing and retaining members 16, 17. The end portion 13 (shown at the right in the drawing) is of substantially cylindrical design in longitudinal cross-section and passes over into a wall portion 18 of the pleated bellows 15 extending substantially vertically relative to the carrier bolt 9. The reinforcing and retaining member 16 is of L-shaped configuration in longitudinal cross-section, the longer leg 19 thereof being arranged at the radially inwardly disposed side of the end portion 13, while the shorter leg 20 is placed on the inner axial end surface of the end portion 13. The reinforcing and retaining member 16 is connected to the elastic part of the sealing cap 12 by vulcanization, the small end surfaces of the reinforcing and retaining member 16 being covered by the material of the elastic part of the sealing cap. The end portion 13 is partly arranged in an annular recess or, respectively, groove 21 designed in the caliper 3. Groove 21 is open towards the carrier bolt 9 so that the end portion 13 with the reinforcing and retaining member is in press fit seated directly on the carrier bolt 9. Between the radial boundary wall 22 of the groove 21 and the outer surface 23 of the end portion 13, there remains a free annular space 24 which conveniently permits insertion of the end portion 13 into the annular groove 21.

For the attachment of the other end portion 14, the brake support member forms a cylindrical extension 25 which passes over into an annular groove 26. The reinforcing and retaining member 17 for the end portion 14 is of bracket-type design and substantially of U-shape in longitudinal cross-section. Hence, it forms first and second wall portions 27, 28 which are interconnected by a base portion 29. With its base portion 29, the reinforcing and retaining member 17 is seated on the cylindrical extension 25 of the brake support member 2. The inwardly disposed wall portion 27 is inclined towards the base portion 29, forming with said an angle in the range of 50° to 80°, and preferably approximately 60°. This wall portion 27 is of S-shaped configuration in longitudinal cross-section, so that its end faces away from the end portion 16 of the elastic bellows in order to avoid damages. The outwardly disposed wall portion 28 is shorter than the inwardly disposed wall portion 27 and is in its full extend arranged in the annular grove 26. The end portion 14 is designed like a foot and comprises a conical enlargement towards its end. At the radially inwardly disposed end, an axially extending shoulder 30 is shaped at the end portion 14. The radially outwardly disposed boundary wall 31 of the annular groove 26 forms a sealing edge, which extends axially over the shoulder and abuts tightly on the outer wall of the end portion 14, thus providing a reliable sealing.

After the pre-assembly of the end portion 14 in the reinforcing and retaining member 17 as described more fully hereinbelow, the assembling process takes place in analogous manner as in the prior art. First, the end portion 13 together with the reinforcing and retaining member 16 is slid onto the carrier bolt 9 by means of a mounting tube in such a fashion that the end portion 13 with its elastic part will move into abutment in the groove of the caliper 3. Subsequently, the caliper 3 will be displaced, as a result whereof the leg 20 of the reinforcing and retaining member 16 will come to bear against the reinforcing and retaining member 17. Upon further movement of the caliper 3, the leg 20 will urge the reinforcing and retaining member with said's end portion 14 completely onto the cylindrical extension 25 until the wall portion 28 is in abutment in the annular groove 32 and the outer boundary wall 31 of the latter is in sealing abutment on the outer wall of the end portion 14.

Figure 3:
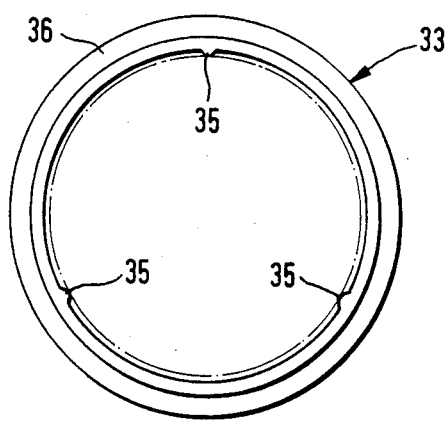
FIG. 3 is a front view of another embodiment of a reinforcing and retaining member.
Figure 4:
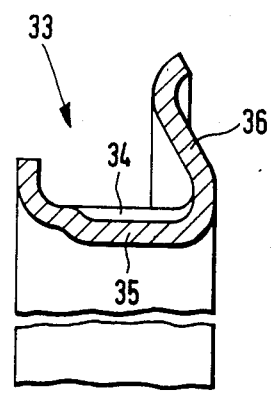
FIG. 4 is a longitudinal cross-section taken through the upper half of the reinforcing and retaining member of FIG. 3; and, FIG. 5 is a cross-section through part of an assembling device for the sealing cap.

Referring now to FIGS. 3 and 4, a different design of a reinforcing and retaining member is illustrated. This reinforcing and retaining member 33 is again of substantially U-shaped configuration in longitudinal cross-section. However, in contrast to the embodiment illustrated in FIGS. 1 and 2, this reinforcing and retaining member 33 includes a base portion 34 in which, spread over the periphery, three radial projections 35 are provided. These projections 35 start from the longer wall portion 36, which is disposed outside of the annular groove in the assembled state, and extend over only part of the length of the base portion 34. With these projections, which also permit a compensation of tolerances, the reinforcing and retaining member 33 is seated on the corresponding cylindrical part in the assembled state—i.e., a cylindrical shoulder on the brake support member 2. Since the projections 35 extend over only part of the length of the base portion, the part without projections can be first mounted on the cylindrical shoulder during the assembly, thus a mounting aid is created.

Figure 5:
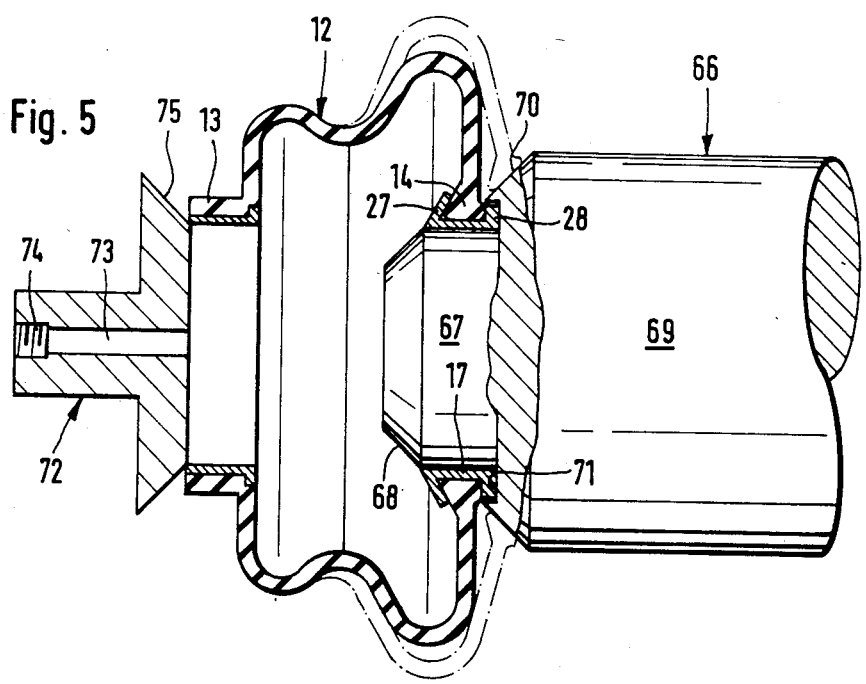

FIG. 5 discloses an assembling device which accommodates fitting of the end portions of sealing caps in corresponding U-shaped reinforcing and retaining members. The assembling device includes a stepped mandrell 66, on whose front cylindrical portion 67 a reinforcing and retaining member 17 is arranged. An insertion chamfer 68 is designed at the front end of the cylindrical portion 67. A second insertion chamfer 70 is provided and extends from a rear cylindrical portion of larger diameter 69 to the front cylindrical portion 67. At the end of said insertion chamfer 70 an annular groove 71 is provided which is deep enough so that the wall portion 28 of the reinforcing and retaining member will be covered completely by it. Opposite to the mandrel 66, a compressed-air adapter is axially displaceably arranged. The compressed-air adapter comprises a compressed-air channel 73 provided with a compressed-air port 74. A conical surface 75 is provided at the front end of the compressed-air adapter 72. At the start of the assembling process, the sealing cap 12 is clamped in between the compressed-air adapter 72 and the mandrel 66, with the end portion 13 abutting on the conical surface 75 of the compressed-air adapter 72, while the end portion 14 abuts on the insertion chamfer 68 of the mandrell 66. Compressed air will then be supplied by way of the compressed-air channel 73 of the compressed-air adapter 72, the sealing cap 12 becoming inflated as a result. The end portion 14 moves along the insertion chamfer 68 over the wall portion 27 of the reinforcing and retaining member to bear against the second insertion chamfer 70. In FIG. 5, this position is illustrated in dotted lines. When the compressed-air supply is interrupted, the end portion of the sealing cap, due to its elasticity, will then automatically move along the insertion chamfer 70 into the reinforcing and retaining member.

What is claimed is:

1. A sealing cap for cylindrical parts such as a bolt guide of a spot-type disc brake, comprising an elastic pleated bellows, the one end portion of which is adapted to be secured at the periphery of a first cylindrical part and the other end portion of which is adapted to be secured at the periphery of a second cylindrical part, wherein a rigid reinforcing and retaining member is provided on at least one of said end portions, with each reinforcing and retaining member being arranged on the same radius with at least part of its radial extension, wherein at least one of the reinforcing and retaining members (17,33) is of substantially U-shaped configuration in axial longitudinal cross-section, thereby forming first and second wall portions (28) and (27;36), and a base portion (29;34) interconnecting the wall portions which embrace the end portion (14) of the sealing cap in a bracket-like configuration, and wherein one of the wall portions (28) is arranged in an annular groove (26) which is designed in the corresponding cylindrical part.

2. A sealing cap as claimed in claim 1, wherein a boundary wall (31) of the annular groove (26) is in sealing abutment on the end portion (14) of the sealing cap.

3. A sealing cap as claimed in claim 1, wherein at least one of the end portions (14) of the sealing cap forms an enlarged foot, when viewed in longitudinal cross-section, which is securely embraced by said U-shaped reinforcing and retaining member.

4. A sealing cap as claimed in claim 3, wherein the wall portion (27;36) of the reinforcing and retaining member that is arranged outside of the annular groove 26 extends, in cross-section, at an acute angle to the base portion (29;34), and wherein the enlarged foot of the end portion is correspondingly of substantially conical design.

5. A sealing cap as claimed in claim 4, wherein the wall portion (28) of the reinforcing and retaining member (17) arranged in the annular groove 26 is shorter in a radial direction than the wall portion (27) arranged outside of the annular groove.

6. A sealing cap as claimed in claim 5, wherein the base portion (29;34) and the transversely extending wall portion (27;36) of the reinforcing and retaining member form an angle in the range of 50° to 80°.

7. A sealing cap as claimed in claim 6, wherein said angle is approximately 60°.

8. A sealing cap as claimed in claim 5, wherein one end portion (14) of the sealing cap (12) includes an axially extending shoulder (30) which is at least partially arranged in the annular groove (26).

9. A sealing cap as claimed in claim 8, wherein the base portion (29;34) of the reinforcing and retaining member (17;33) is seated on an axially extending cylindrical extension (25) of the corresponding cylindrical part (2).

10. A sealing cap as claimed in claim 5, wherein the wall portion (27;36) of the reinforcing and retaining member arranged outside of the groove is of substantially S-shaped configuration, when viewed in longitudinal cross-section.

11. A sealing cap as claimed in claim 10, wherein radial projections (35) are provided at the base portion (34) of the reinforcing and retaining member (17;33).

12. A sealing cap as claimed in claim 11, wherein the radial projections (35) extend from the wall portion (36) arranged outside of the groove over part of the length of the base portion (34) only.

13. An assembling device as claimed in claim 12, wherein a second insertion chamfer (70) is provided at the transition from the annular groove (71) to the portion of enlarged diameter (69).

* * * * *